US009835802B1

(12) United States Patent
Qiao

(10) Patent No.: US 9,835,802 B1
(45) Date of Patent: Dec. 5, 2017

(54) REGROUP NXM OPTICAL CABLE

(71) Applicant: Lijie Qiao, Ottawa (CA)

(72) Inventor: Lijie Qiao, Ottawa (CA)

(*) Notice: Subject to any disclaimer, the term of this patent is extended or adjusted under 35 U.S.C. 154(b) by 0 days.

(21) Appl. No.: 15/605,690

(22) Filed: May 25, 2017

Related U.S. Application Data

(60) Provisional application No. 62/377,038, filed on Aug. 19, 2016.

(51) Int. Cl.
*G02B 6/36* (2006.01)
*G02B 6/44* (2006.01)
*G02B 6/38* (2006.01)

(52) U.S. Cl.
CPC ........ *G02B 6/3672* (2013.01); *G02B 6/3668* (2013.01); *G02B 6/4471* (2013.01); *G02B 6/3885* (2013.01); *G02B 6/3893* (2013.01)

(58) Field of Classification Search
CPC ............... G02B 6/3668; G02B 6/3672; G02B 6/4471–6/4472
See application file for complete search history.

(56) References Cited

U.S. PATENT DOCUMENTS

| 4,026,693 A * | 5/1977 | Sato ...................... C03B 37/027 385/121 |
| 4,943,136 A * | 7/1990 | Popoff ................... G02B 6/2804 385/46 |
| 5,020,871 A * | 6/1991 | Nishimura ............... G02B 6/04 385/24 |
| 5,204,925 A | 4/1993 | Bonanni et al. ................ 385/89 |
| 5,293,443 A * | 3/1994 | Eoll ..................... G02B 6/4403 385/110 |
| 5,734,777 A * | 3/1998 | Merriken ............... G02B 6/445 385/135 |
| 6,005,991 A | 12/1999 | Knasel .......................... 385/14 |
| 6,104,371 A * | 8/2000 | Wang ..................... G02B 6/001 345/102 |
| 6,243,520 B1 * | 6/2001 | Goldman ................. G02B 6/06 385/115 |
| 6,351,590 B1 * | 2/2002 | Shahid ................ G02B 6/3608 385/114 |
| 6,464,404 B1 * | 10/2002 | Robinson ................. G02B 6/04 385/137 |
| 6,655,848 B2 * | 12/2003 | Simmons ............. G02B 6/3636 385/56 |
| 6,744,956 B2 * | 6/2004 | Sun ......................... G02B 6/28 385/114 |
| 6,885,800 B2 * | 4/2005 | Sun ......................... G02B 6/28 385/114 |
| 6,985,665 B2 * | 1/2006 | Baechtle ............. G02B 6/4472 385/134 |

(Continued)

*Primary Examiner* — Jerry Rahll
(74) *Attorney, Agent, or Firm* — Teitelbaum & MacLean; Neil Teitelbaum

(57) ABSTRACT

A method of manufacturing an optical cable includes providing a plurality of fibers supported by a support structure, wherein, positions of the plurality of fibers in a reference cross-section form N rows extending in a first direction and M rows extending in a second direction different from the first direction. The method includes separating fiber ends at the first cable end into N rows and connectorizing them with N connectors. The method also includes separating fiber ends at the second cable end into M rows and connectorizing them with M connectors.

20 Claims, 4 Drawing Sheets

(56) References Cited

U.S. PATENT DOCUMENTS

| | | | |
|---|---|---|---|
| 7,689,079 B2 * | 3/2010 | Burnham | G02B 6/3897 |
| | | | 385/15 |
| 7,756,371 B1 * | 7/2010 | Burnham | G02B 6/3897 |
| | | | 385/15 |
| 8,009,959 B2 * | 8/2011 | Barnes | G02B 6/0365 |
| | | | 385/14 |
| 8,596,879 B2 * | 12/2013 | Budd | G02B 6/43 |
| | | | 264/1.25 |
| 2003/0031452 A1 | 2/2003 | Simmons et al. | 385/147 |
| 2003/0202759 A1 * | 10/2003 | Sun | G02B 6/28 |
| | | | 385/114 |
| 2004/0240812 A1 * | 12/2004 | Sun | G02B 6/28 |
| | | | 385/114 |
| 2008/0175553 A1 * | 7/2008 | Hendrickson | G02B 6/4471 |
| | | | 385/135 |
| 2009/0180737 A1 * | 7/2009 | Burnham | G02B 6/4453 |
| | | | 385/59 |
| 2010/0195955 A1 * | 8/2010 | Burnham | G02B 6/4472 |
| | | | 385/24 |
| 2013/0044979 A1 * | 2/2013 | Budd | G02B 6/38 |
| | | | 385/59 |

* cited by examiner

US 9,835,802 B1

REGROUP NXM OPTICAL CABLE

CROSS-REFERENCE TO RELATED APPLICATIONS

The present application claims priority from U.S. Patent Application No. 62/377,038 filed Aug. 19, 2016, and U.S. patent application Ser. No. 15/494,598 filed Apr. 24, 2017, which are incorporated herein by reference for all purposes.

TECHNICAL FIELD

The present disclosure relates generally to optical cables and, more particularly, to regroup cables and methods for making thereof.

BACKGROUND OF THE INVENTION

The modern telecommunication systems often include optical fiber networks, and thus require a variety of equipment, including devices for multiplexing, demultiplexing, and switching of optical signals. The switching may be implemented in the electronic domain; however, the electronic circuits limit the maximum bandwidth of the signal. Therefore, it is desirable to use transparent, all-optical devices.

One particular problem associated with optical switching relates to an N×M interconnect, wherein signals of N devices are split and the resulting fibers are interconnected into M output signals. By way of example, such connectors may be used with switching arrays that switch signals between optical fibers on the per-wavelength basis. The interconnect itself, routing the fibers between splitters and combiners, may be achieved with a variety of interconnecting devices, such as regroup fiber plates. However, the fiber plates have a relatively large size. The complexity of the fiber plates often leads to human errors in the placement of fibers in the complex configurations. Furthermore, the brittleness of the fibers affects the design solutions, and fibers may break if routed and bended by a machine. Alternatively, US 20030031452 teaches a three dimensional manifold with curved passageways. However, pushing fibers through bends inside the manifold may cause fiber breakage. Additionally, the manifolds themselves are manufactured using expensive techniques, such as stereolithography ("SLA"), fused deposition modeling ("FDM"), selective laser sintering ("SLS"), and the like.

Accordingly, there is a need for an optical device that enables an N×M interconnect and is easy to manufacture and use.

SUMMARY OF THE INVENTION

The disclosure relates to a method of manufacturing an optical cable. The method includes:

(1) providing a plurality of fibers supported by a support structure, wherein the support structure has first and second ends, wherein, between the first and second ends of the support structure, the plurality of fibers are straight and parallel to one another, and wherein, in a reference cross-section between the first and second ends of the support structure, positions of the plurality of fibers form N rows extending in a first direction and M rows extending in a second direction different from the first direction;

(2) at the first end of the support structure: separating ends of the plurality of fibers into N rows, each including ends of fibers extending through one of the N rows in the reference cross-section, and connectorizing the plurality of fibers with N connectors, each connectorizing one of the N rows of fiber ends;

(3) at the second end of the support structure: separating ends of the plurality of fibers into M rows, each including ends of fibers extending through one of the M rows in the reference cross section, and connectorizing the plurality of fibers with M connectors, each connectorizing one of the M rows of fiber ends.

Another aspect of the disclosure relates to an optical cable that has first and second cable ends and includes a support structure disposed between the first and second cable ends and a plurality of fibers supported by the support structure, wherein the support structure has first and second ends, wherein the first end of the support structure is disposed between the first cable end and the second end of the support structure, wherein, between the first and second ends of the support structure, the plurality of fibers are straight and parallel to one another;

wherein, in a reference cross-section of the plurality of fibers between the first and second ends of the support structure, positions of the plurality of fibers form N rows extending in a first direction and M rows extending in a second direction different from the first direction, and wherein, at the first cable end, for each of the N rows extending in the first direction, a connector is attached to fibers extending through said row and, at the second cable end, for each of the M rows extending in the second direction, a connector is attached to fibers extending through said row.

BRIEF DESCRIPTION OF THE DRAWINGS

The invention will be described in greater detail with reference to the accompanying drawings which represent preferred embodiments thereof, wherein.

DETAILED DESCRIPTION

The method disclosed herein is based on an observation that an N by M matrix of fiber ends may have connectors attached either horizontally or vertically with respect to the instant position of the matrix. In other words, the N×M arrangement of fibers that has N rows and M columns may be connectorized with N connectors or with M connectors. The inventor has realized that, if the N×M arrangement of fibers is maintained, using M connectors at one end of the cable and N connectors—at the other end will form an interconnect device without actual shuffling of fibers, but only regrouping the fibers differently at different ends of the cable.

Figure 1:
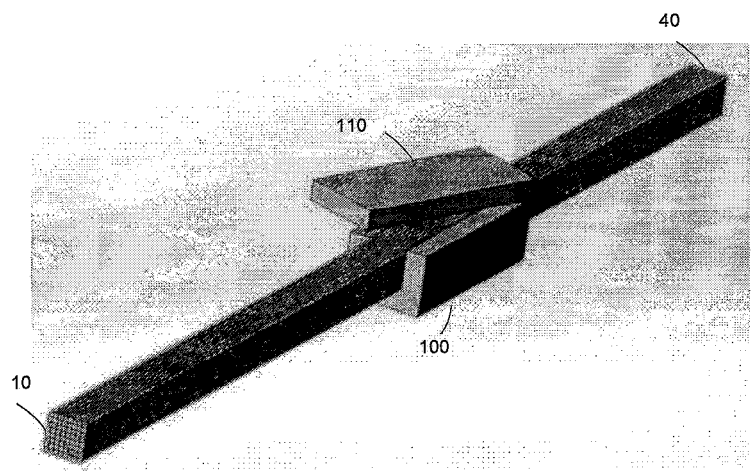
FIG. 1 illustrates an embodiment of the method.

FIG. 1 illustrates a convenient way of arranging fibers by placing then in a Π-shaped support 100 with an optional lid 110, The rectangular cross-section of the support 100 helps to arrange the fibers into an N×M arrangement. With the sufficient length of the support, the fibers are kept parallel to each other within the support and fiber ends extending out of the support maintain the N×M arrangement.

Then, the first end 10 of the fiber bundle is separated into N rows and a 1×M connector is attached to each row. After that or concurrently, the second end 40 of the fiber bundle is separated into M rows and a 1×N connector is attached to each row. The method is simple and elegant in its simplicity.

Advantageously, there is no need to push fibers into curved channels as taught in US 20030031452 where the fiber ends meet resistance of channel walls and, thus, may be broken. In the instant method, the fibers are kept straight within the support and may be carefully fanned out at the cable ends; meeting no resistance, the fibers are more safe from breakage.

Additionally, the support structures used by the instant method, e.g. the Π-shaped support 100, are significantly less expensive than the curved manifolds taught in US 20030031452. Considering that the N×M interconnect function is ubiquitous in optical communication systems, the less expensive method of cable manufacturing disclosed herein provides for a significant economic effect while lessening any chance of error in connectorizing groups of optical fibers.

Figure 2:
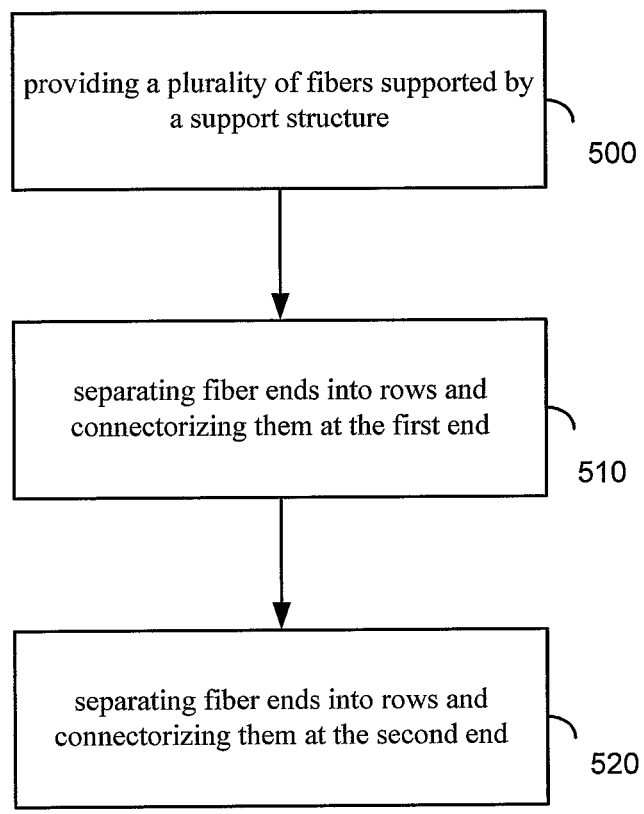
FIG. 2 is a flowchart of the method.

With reference to FIG. 2, the method of manufacturing an optical cable includes providing a plurality of fibers supported by a support structure, step 500. The fibers are straight and parallel to one another within the support structure, i.e. between the first and second ends of the support structure.

Figure 3:
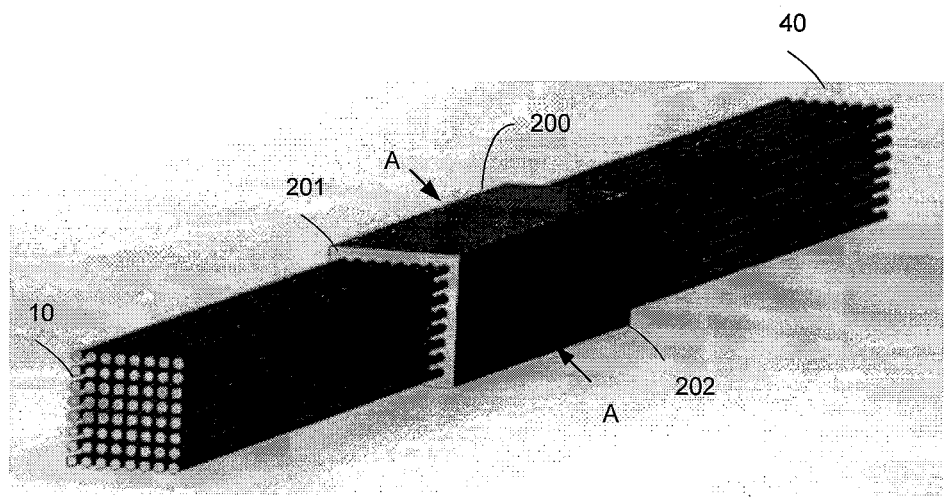
FIGS. 3 and 3A illustrate an embodiment of the method.
Figure 3A:
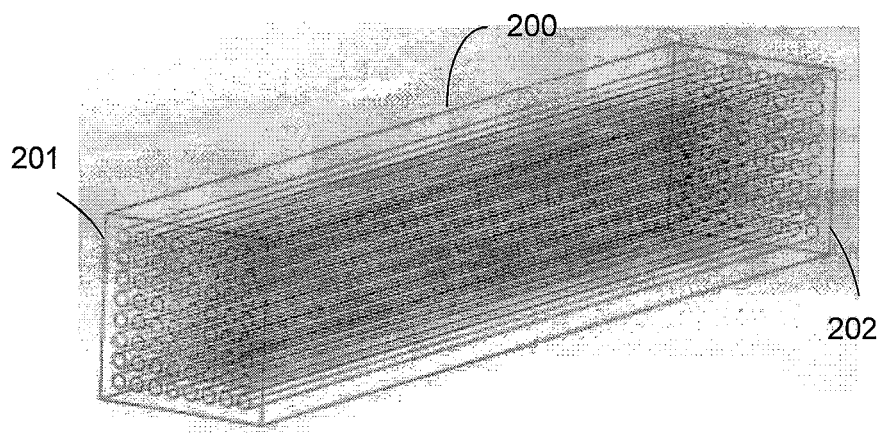

FIG. 1 illustrates one embodiment of the method. In another embodiment illustrated in FIGS. 3 and 3A, the support structure is a holder 200 with N×M passageways, also referred herein as channels, extending through the holder 200. At the first end 201 of the holder 200, openings of the channels form N rows extending in one direction, horizontally relative to the drawing, and M rows extending in a different direction, vertical with respect to the drawing. Within the support structures, i.e. between the ends 201 and 202, the fibers are straight and parallel to one another.

Arrows A indicate a particular cross section of the fibers; it will be used herein as a reference for describing relative positions of the fibers. Since the fibers are parallel to each other within the support structure, all the cross sections between the first and second ends of the support structure are identical in the sense that relative positions of the fiber are same for each of the cross sections. For certainty, one of the cross sections is chosen as a reference.

Figure 4:
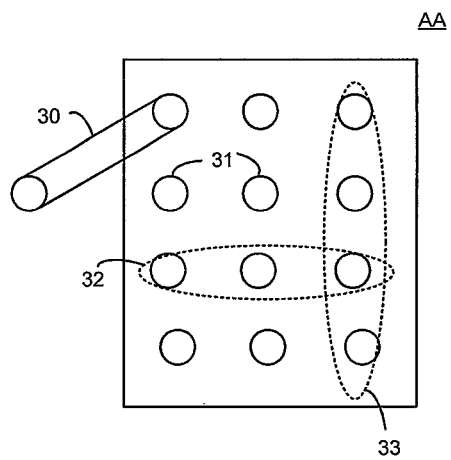
FIG. 4 is a schematic representation of a reference cross section.

In the reference cross-section, positions of the fibers form N rows extending in a first direction and M rows extending in a second direction different from the first direction. FIG. 4 illustrates the reference cross-section AA, irrespective the differences between values for N and M between the drawings. Fibers 30 (just one is shown in FIG. 4) extend through the cross section AA. Each fiber is characterized by a particular position where the fiber goes through the cross sectional plane. The fiber positions, exemplified by circles 31, form N rows within the cross section AA, such as a row 32. The N rows are parallel to each other and extend in a first direction, horizontal relative to the drawing. Simultaneously, the same fiber positions within the same cross section AA form M rows within the cross section AA, such as a row 33. The M rows are parallel to each other and extend in a second direction, vertical relative to the drawing. Elsewhere in this disclosure, the expressions "row of fibers" or "row of fiber ends" should be understood as related to fibers extending through a particular row of fiber positions in the reference cross section.

Figure 5:
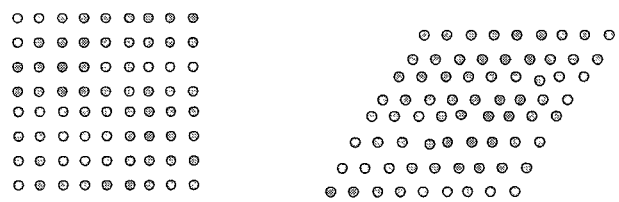
FIG. 5 illustrates rows of fibers in a reference cross section.

Preferably, the first and second directions are substantially orthogonal, i.e. form an angle of from 80 to 90 degrees. Then, the cross section of fibers, or fiber ends, form a rectangular (FIG. 5, left). Alternatively, the reference cross section has a parallelogram of fiber positions (FIG. 5, right). Preferably, the smallest angle between the first and second directions is not less than 30 degrees.

The method of manufacturing the optical cable further includes separating fiber ends into rows and connectorizing them at the first end, step 510 in FIG. 2, and at the second end, step 520. During the first end step 510, the fibers are separated into N rows, each consisting of ends of fibers extending through one of the N rows in the reference cross-section. The separation occurs at the end of the support structure, i.e. in the proximity of the support structure sufficient for maintaining the N×M arrangement of the fibers. Each row of fibers is connectorized with a connector; N connectors are attached to fiber ends at the first end of the cable.

In one embodiment of the method, the N rows of fiber ends are separated and connectorized one by one, wherein an outermost of the N rows of fiber ends is separated and connectorized before others, and then a row adjacent to the outermost row is separated and connectorized. The separation of fibers may be performed using a tool that has a planar portion, such as a sheet or elongate member, for inserting between fibers.

In one embodiment of the method, the operation 510 includes separating the N rows from one another, and then attaching the N connectors to the N rows of fiber ends. A comb-like tool may be used for separation of the fiber ends.

Preferably, each of the N connectors is implemented in a 1×N connector, wherein fiber ports or holes are disposed in a line. By way of example, the connectors may be multi fiber termination (MTP) connectors or multi fiber push on (MPO) connectors. In one embodiment, the M ports forming a row and discussed above as coupled with a single connector, may be grouped into two or more connectors understood herein as forming a single 1×N connector.

The second end step 520 is symmetrical to the first end step 510, with the modification that it includes separating fiber ends into M rows, and attaching M connectors. Otherwise, everything disclosed with reference to the operation 510 also relates to the operation 520.

The operations 510 and 520 at different ends of the cable may be performed sequentially or, at least partially, overlapping in time.

In one embodiment of the method, the support structure includes a first support and a second support spaced apart from the first support. The two supports may be same-shaped plates or blocks e.g. made of polymer, with a plurality of channels for inserting the fibers. Each of the supports may be an integral unit with an N×M arrangement of fibers extending therethrough. Alternatively, the first and/or second support may contain more than one separate sections.

The two supports may be movable along the fibers. For inserting the fibers, the supports may be disposed adjacent to one another, so that each open channel of one support continues into an open channel of the second support. Then, the supports may be moved toward respective ends of the cable and be substantially separated so as to maintain the N×M arrangement of parallel fibers. After attaching the connectors, there is no need in maintaining the structure within the plurality of fibers, and the supports may be moved closer to one another thus increasing the flexibility and the ability of the cable.to twist. The cable may be twisted to have a predetermined twist and fixed e.g. by applying a wrap, tape, ties, or the like. The twist may be of 90 degrees, to make all the connectors on both sides of the cable substantially parallel to one another.

In another embodiment, the support structure contains N plates arranged in a stack, wherein each of the N plates supports M fibers. The plates may have grooves or channels for the fibers.

In one embodiment of the method, at least a portion of the support structure provided in step 500 is removed after at least some of the fibers ends are connectorized. The fibers may be kept together with a wrap, tape, etc. that constitute a support structure of the ready cable.

Figure 8:
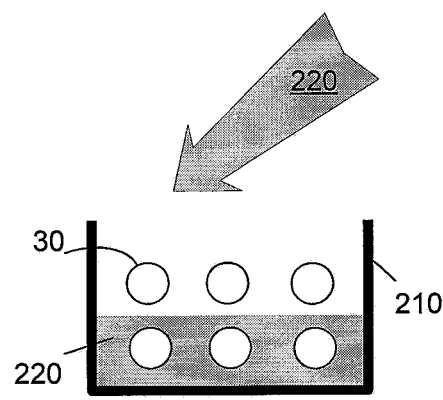
FIG. 8 illustrates an embodiment of the method.

In yet another embodiment of the method, providing the plurality of fibers supported by the support structure, step 500, includes providing a support, adding N layers each comprising M fibers to the support, and fixing each of the N layers with an adhesive. The solidified adhesive forms the support structure supporting the fibers in the N×M arrangement. FIG. 8 illustrates rows of fibers 30 fixed with adhesive 220; the fibers are added to a Π-shaped support 210. Supports of other shape, including flat supports, may be used for adhesively combining the rows or fibers.

In one embodiment of the method, the support structure is formed of resin that may be added gradually after a next portion of fibers is arranged in a predefined order as illustrated in FIG. 8, wherein fibers 30 are placed into a support 210 while resin 220 is added onto the fibers.

Figure 6:
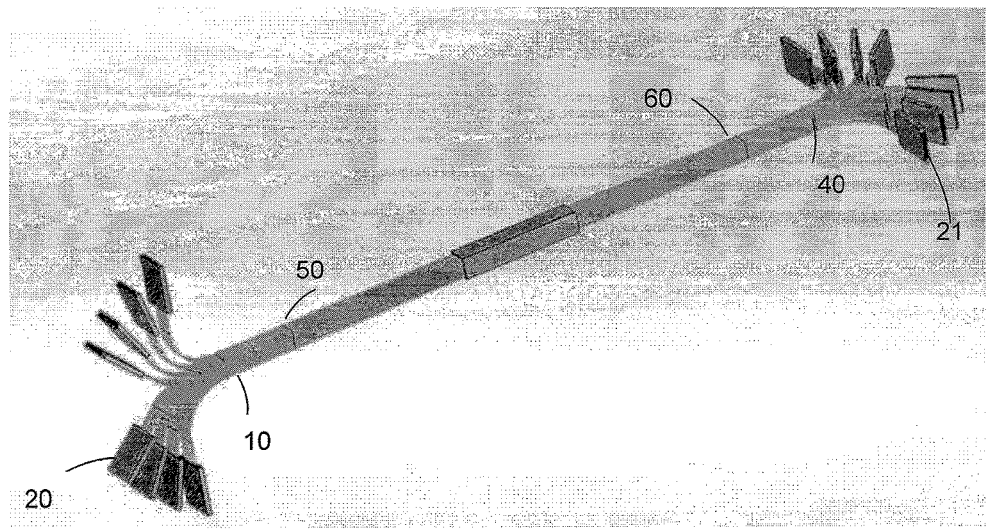
FIGS. 6 and 7 illustrate a cable made by the method disclosed herein.
Figure 7:
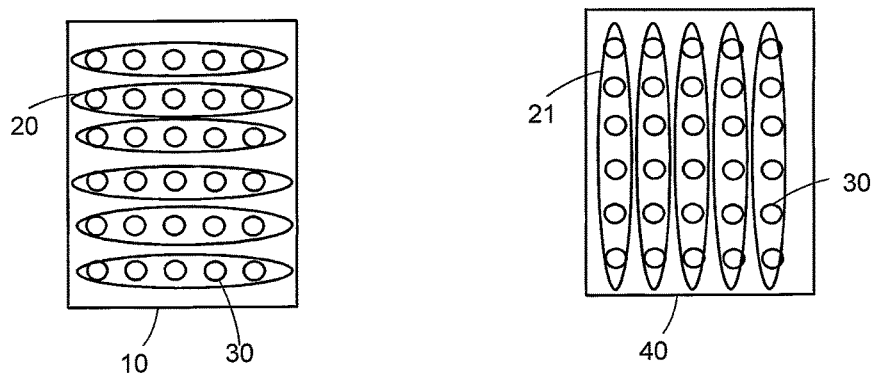

The aforedescribed method results in a cable that includes a support structure disposed between the first and second cable ends and a plurality of fibers supported by the support structure. The fibers are straight and parallel to one another within the support structure, between its first and second ends proximate to the first and second ends of the cable, respectively. In an arbitrary cross section of the cable between the first and second ends of the support structure, that is referred to as a reference cross section, positions of the plurality of fibers form N rows extending in a first direction and M rows extending in a second direction different from the first direction, as illustrated in FIGS. 3-5 and 7. At the first cable end, for each of the N rows extending in the first direction, a connector is attached to fibers extending through said row, as illustrated in FIGS. 6 and 7. At the second cable end, for each of the M rows extending in the second direction, a connector is attached to fibers extending through said row, as illustrated in FIGS. 6 and 7

The smallest angle between the first and second directions of row positions is of at least 30 degrees and preferably of from 80 to 90 degrees.

The connectors may be multi fiber termination (MTP) connectors or multi fiber push on (MPO) connectors.

The support structure may be any of the structures discussed above, e.g. a single block with plurality of passageways, a combination of at least two holders, a Π-shaped support 100, or a structure formed of solidified adhesive. In the embodiment where the initial support structure has been removed after the fibers have been connectorized, or during that process, the cable may have an external support holding the fibers together, on at least one location. Examples of such later added support structures are wraps, enclosures, ties, tapes, and the like.

The resulting cable is a regroup cable because it regroups the NM fibers between N connectors at the first end of the cable and M other connectors at the second end of the cable. With reference to FIG. 6, the cable has N connectors 20 attached to a first cable end 10 and M connectors 21 attached to a second cable end 40. In the drawing N=M=8. FIG. 6 illustrates the embodiment wherein the support structure includes two supports: a first support 50 and a second support 60 spaced apart from the first support. The first support 50 is disposed proximate to or directly at the first end 10 of the cable, and the second support 60 is disposed proximate to or directly at the second end 40 of the cable. For certainty, the first support 50 is disposed between the first cable end 10 and the second support 60, whereas the second support 60 is disposed between the first support 50 and the second cable end 40. Relative positions of the NM fibers in the first support are same as relative positions of the fibers in the second support.

With reference to FIG. 7, the first end 10 has N=6 connectors 20 attached, each connector for receiving M=5 optical fibers 30. The connectors 20 at the cable end 10 are shown disposed horizontally relative to the drawing. At the second end 40, connectors 21 are shown in vertical positions.

Of course, the numbers of rows N and M shown in the drawings are for illustrative purposes only. Each number of rows, N and M, may take values between 4 and 48, inclusive, more preferably, between 8 and 24, inclusive. In one embodiment, the number of roes in the first direction is equal to the number of rows in the second direction, N=M.

Elements of different embodiments disclosed herein may be combined unless they are mutually exclusive. Numerous modifications and variations of the present invention are possible in light of the above teachings. It is therefore to be understood that within the scope of the appended claims, the invention may be practiced otherwise than as specifically described herein.

I claim:

1. A method of manufacturing an optical cable comprising a plurality of fibers, the method comprising:
   (1) providing the plurality of fibers supported by a support structure, wherein the support structure has first and second ends,
   wherein, between the first and second ends of the support structure, the plurality of fibers are straight and parallel to one another, and
   wherein, in a reference cross-section between the first and second ends of the support structure, positions of the plurality of fibers form N rows extending in a first direction and M rows extending in a second direction different from the first direction;
   (2) at the first end of the support structure:
   separating ends of the plurality of fibers into N rows, each comprising ends of fibers extending through one of the N rows in the reference cross-section, and
   connectorizing the plurality of fibers with N connectors, each connectorizing one of the N rows of fiber ends;
   (3) at the second end of the support structure:
   separating ends of the plurality of fibers into M rows, each comprising ends of fibers extending through one of the M rows in the reference cross section, and
   connectorizing the plurality of fibers with M connectors, each connectorizing one of the M rows of fiber ends.

2. The method as defined in claim 1, wherein the N rows of fiber ends are separated and connectorized one by one, wherein an outermost of the N rows of fiber ends is separated and connectorized before others, and then a row adjacent to the outermost row is separated and connectorized.

3. The method as defined in claim 1, wherein step (2) comprises separating the N rows of fiber ends from one another and then attaching the N connectors to the N rows of fiber ends.

4. The method as defined in claim 1, wherein at least a portion of the support structure is removed after at least a portion of the fibers ends are connectorized.

5. The method as defined in claim 1, wherein the first and second directions form an angle of from 80 to 90 degrees.

6. The method as defined in claim 1, wherein the connectors comprise a multi fiber termination (MTP) connector or a multi fiber push on (MPO) connector.

7. The method as defined in claim 1, wherein steps (2) and (3) at last partially overlap in time.

8. The method as defined in claim 1, wherein M and N each is greater than or equal to 4 and less than equal to 48.

9. The method as defined in claim 1, wherein the support structure comprises a first support and a second support spaced apart from the first support.

10. The method as defined in claim 1, wherein the support structure comprises a holder with a plurality of channels extending therethrough, wherein openings of the plurality of channels at a first end of the holder form N rows extending in one direction and M rows extending in a different direction.

11. The method as defined in claim 1, wherein the support structure comprises N plates arranged in a stack, wherein each of the N plates supports M fibers.

12. The method as defined in claim 1, wherein the support structure comprises a Π-shaped support.

13. The method as defined in claim 1, wherein providing the plurality of fibers supported by the support structure comprises providing a support and adding N layers each comprising M fibers over the support, wherein each of the N layers is fixed with an adhesive.

14. An optical cable manufactured by the method defined in claim 1.

15. An optical cable having first and second cable ends and comprising:

a support structure disposed between the first and second cable ends, and a plurality of fibers supported by the support structure, wherein the support structure has first and second ends, wherein the first end of the support structure is disposed between the first cable end and the second end of the support structure, wherein, between the first and second ends of the support structure, the plurality of fibers are straight and parallel to one another;

wherein, in a reference cross-section of the plurality of fibers between the first and second ends of the support structure, positions of the plurality of fibers form N rows extending in a first direction and M rows extending in a second direction different from the first direction, and wherein, at the first cable end, for each of the N rows extending in the first direction, a connector is attached to fibers extending through said row and, at the second cable end, for each of the M rows extending in the second direction, a connector is attached to fibers extending through said row.

16. The optical cable as defined in claim 15, wherein the first and second directions form an angle of from 80 to 90 degrees.

17. The optical cable as defined in claim 15, wherein the connectors comprise multi fiber termination (MTP) connectors or multi fiber push on (MPO) connectors.

18. The optical cable as defined in claim 15, wherein M and N each is greater than or equal to 4 and less than equal to 48.

19. The optical cable as defined in claim 15, wherein the support structure comprises a first support and a second support spaced apart from the first support.

20. The optical cable as defined in claim 15, wherein the support structure comprises a Π-shaped support.

* * * * *